United States Patent [19]

Lecocq

[11] Patent Number: 4,929,941
[45] Date of Patent: May 29, 1990

[54] DEVICE FOR TRANSMITTING ITEMS OF INFORMATION FOR AN AUTOMOBILE VEHICLE AND A METHOD OF USING SAID DEVICE

[75] Inventor: Jean-Luc Lecocq, Sevres, France

[73] Assignees: Automobiles Peugeot, Paris; Automobiles Citroen, Neuilly Sur Seine; Regie Nationale des Usines Renault, Boulogne Billancourt, all of France

[21] Appl. No.: 274,311

[22] Filed: Nov. 21, 1988

[30] Foreign Application Priority Data

Nov. 25, 1987 [FR] France ................................ 87 16367

[51] Int. Cl.⁵ ........................ H04B 14/00; H04L 7/00
[52] U.S. Cl. .................................. 340/825.14; 370/27; 375/36; 340/825.06
[58] Field of Search ............. 340/825.14, 825, 825.06; 307/260, 264, 231, 350, 358; 375/27, 36, 55, 56, 31; 370/27; 371/67, 70

[56] References Cited

U.S. PATENT DOCUMENTS 3,289,168 11/1966 Walton et al. .
4,013,875 3/1977 McGlynn .
4,063,220 12/1977 Metcalfe .
4,227,095 10/1980 Bazil .................................... 307/260
4,507,793 3/1985 Adams .
4,535,294 8/1985 Ericksen et al. .................... 307/358
4,636,654 1/1987 Lach ................................... 307/260

FOREIGN PATENT DOCUMENTS 0117832 9/1984 European Pat. Off. .
2416509 8/1979 France .
WO80/01008 5/1980 World Int. Prop. O. .

Primary Examiner—Donald J. Yusko
Assistant Examiner—Eric O. Pudpud
Attorney, Agent, or Firm—Burns, Doane, Swecker & Mathis

[57] ABSTRACT

This device for the differential transmission of items of information between at least two elements (1, 2) of an automobile vehicle, each of which elements comprises transmitting means (13, 16) and information receiving means (14, 17) interconnected by two information transmitting lines (11, 12), further comprises means (14a, 17a, 14b, 17b) for processing signals circulating in the information transmitting lines whereby to permit an operation of the device in a degraded mode from signals circulating in one of the information transmitting lines (11, 12).

6 Claims, 2 Drawing Sheets

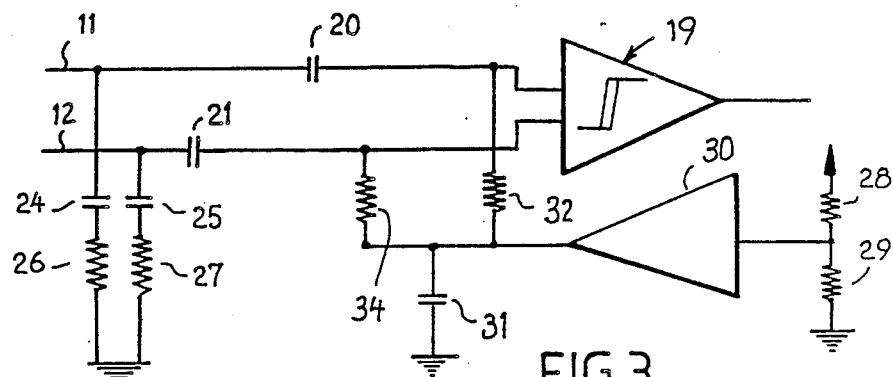
FIG.3
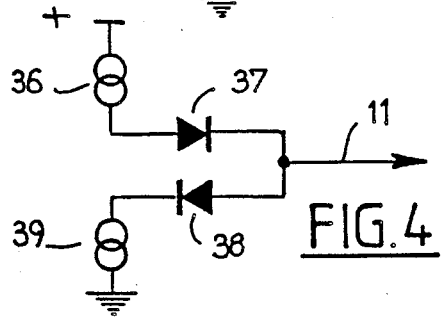
FIG.4
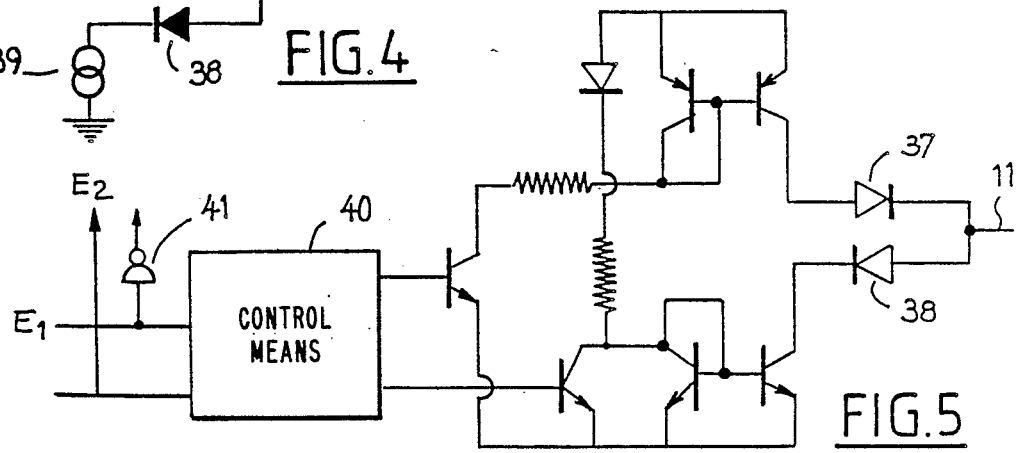
FIG.5
| Element 1 → Element 2 | | | | Element 2 → Element 1 | | | | |
|---|---|---|---|---|---|---|---|---|
| start synchro | Address | data | CRC | Reaction | start synchro | Address | data | CRC |
|  |  |  |  |  |  |  |  |  |
FIG.6

DEVICE FOR TRANSMITTING ITEMS OF INFORMATION FOR AN AUTOMOBILE VEHICLE AND A METHOD OF USING SAID DEVICE

BACKGROUND

The present invention relates to a device for transmitting information between at least two elements of an automobile vehicle and a method for transmitting information by use of said device.

More particularly, the invention relates to devices for a differential transmission of items of information which were developed in the course of the designing of transmission systems for an automobile vehicle owing to a number of problems concerning these applications and in particular disturbances liable to disturb these transmissions.

The use of the differential transmission provides a good immunity from these disturbances but it has a number of drawbacks as concerns its reliability.

Indeed, this reliability is related to the reliability of the connecting means (microswitching, oxidation of the contacts, etc. . .), the possibility of one of the transmission wires of contacting the body of the terminal of the battery, which prevents the correct operation of this type of transmission system.

An object of the invention is therefore to solve these problems by providing an information transmitting device which is reliable, simple, cheap and permits ensuring a sufficient transmission of information even when one of the transmission lines is subjected to a disturbance.

The invention therefore provides a device for the differential transmission of items of information between at least two elements of an automobile vehicle, each of which elements comprises information transmitting means and information receiving means connected by two information transmission lines, said device further comprising means for processing signals circulating in the information transmission lines whereby to permit an operation of the device in a degraded mode with signals circulating on one of the information transmitting line.

Advantageously, the processing means comprise means for establishing the derivative of the signals circulating in the information transmitting lines and means for shaping the output signals of said derivative establishing means, provided in the receiving means of each element.

According to another aspect, the invention also provides a method for transmitting items of information by employing a device such as that just defined in which one of the elements is a master element and the other a slave element, the master element delivering a synchronization word before each message, and the slave element transmitting a message in response, wherein the slave element also delivers a synchronization word before transmitting the response message thereof.

BRIEF DESCRIPTION OF THE DRAWINGS

A better understanding of the invention will be had from the following description which is given solely by way of example with reference to the accompanying drawings in which:

FIG. 3 is a diagram of information receiving means which are part of an element of a device according to the invention;

FIG. 4 is a block diagram of information transmitting means which are part of a device according to the invention;

FIG. 5 is a more detailed diagram of the transmitting means shown in FIG. 4, and FIG. 6 illustrates a method for transmitting information employing the device according to the invention.

DETAILED DESCRIPTION OF THE PREFERRED EMBODIMENT

Figure 1:
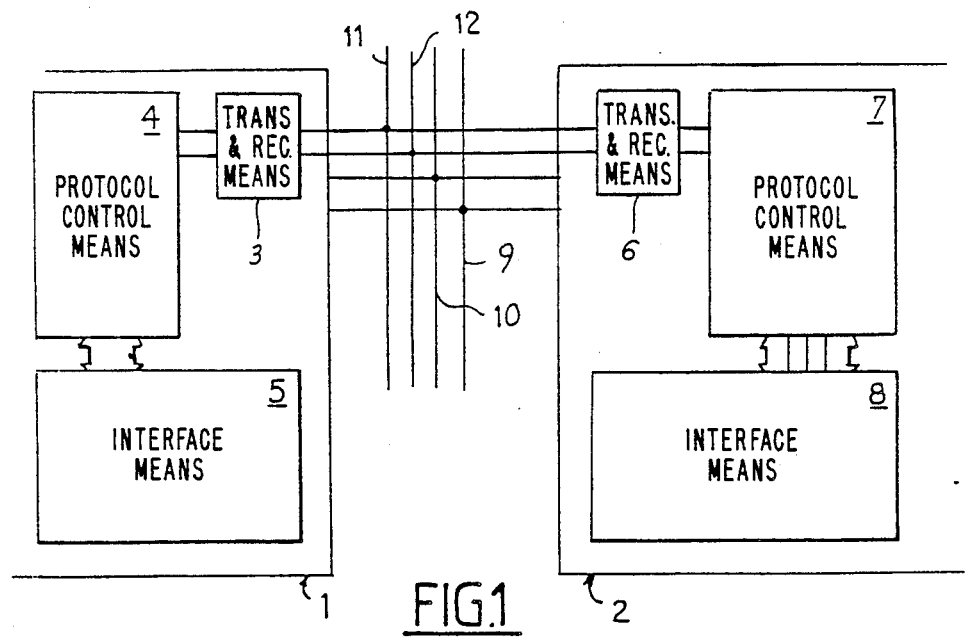
FIG. 1 is a block diagram illustrating the operation of a device for the differential transmission of information.

As can be seen in FIG. 1, a device for the differential transmission of items of information comprises at least two elements 1 and 2 disposed for example in different regions of an automobile vehicle for controlling different component parts of the vehicle, one of said elements, 1, being a master element and the other element, 2, a slave element. The device according to the invention may of course also be applied to a multi-master system.

Each element 1 or 2 comprises means, for example 3 in respect of the element 1, for transmitting and receiving items of information connected to means 4 for controlling the the protocol of exchange of items of information of the element, said means 4 being connected through interface means 5 for example to a microprocessor, an analog-digital converter or input-output gates.

The element 2 comprises equivalent components carrying respectively the reference characters 6, 7 and 8. Each element receives through supply lines 9 and 10 a supply, for example +12 V−OV.

Furthermore, two information transmitting lines 11 and 12 are also connected to the information transmitting and receiving means 3 and 6 of the elements 1 and 2 respectively, these lines being also connected for example to other elements disposed in other regions of the automobile vehicle.

This architecture of an information transmitting device is well known in the art and will not be described in more detail.

Figure 2:
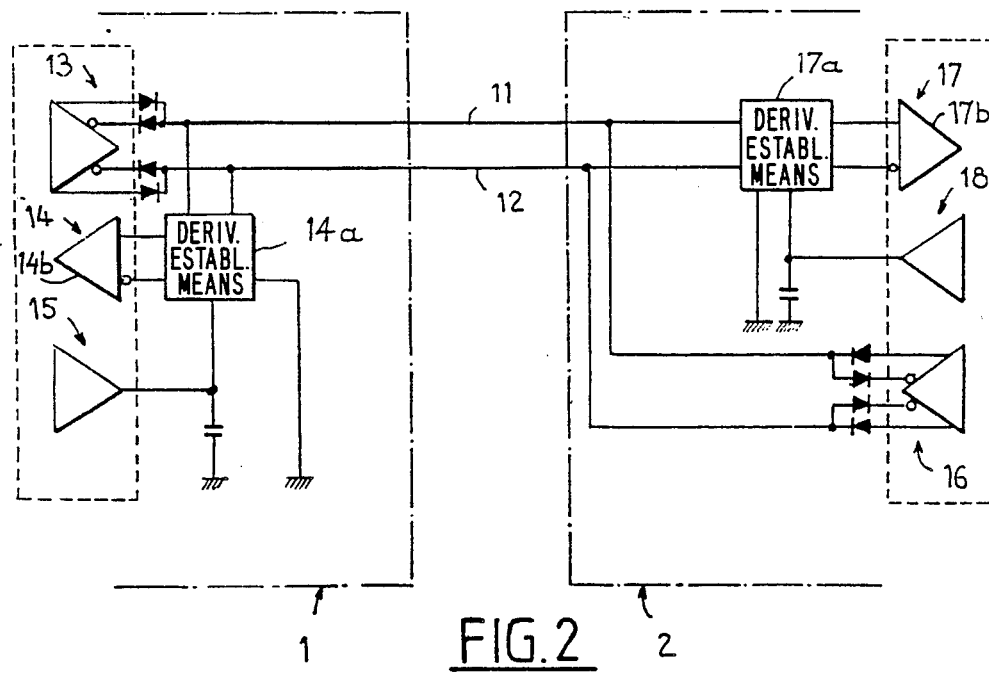
FIG. 2 is a block diagram of two elements of an automobile vehicle interconnected by two information transmission lines which are part of a device according to the invention.

With reference now to FIG. 2, in which are shown the elements 1 and 2 and the lines 11 and 12 shown in FIG. 1, it can be seen that each element, for example 1, comprises, connected to the lines 11 and 12, information transmitting means 13, information receiving means 14 and means 15 for generating a bias voltage connected to the information receiving means 14. The element 2 comprises equivalent means carrying the reference characters 16, 17 and 18 respectively.

The information receiving means 14 and 17 comprise, on one hand, means 14a and 17a for establishing the derivatives of the signals circulating in the transmission lines 11 and 12 and, on the other hand, means 14b and 17b for shaping the output signals of said means.

With reference now to FIG. 3 which represents in more detail an embodiment of the receiving means 14 or 17 described with reference to FIG. 2, it can be seen that the lines 11 and 12 are connected to the inputs of a comparator 19 through capacitors 20 and 21. The comparator 19 comprises a comparator having a small offset and a centered hysteresis relative to the bias voltage, formed for example by an LM 139 comparator manufactured by the firm National Semiconductors.

The lines 11 and 12 are also connected to the ground through capacitors 24, 25 in series with resistors 26, 27 respectively. The capacitors 24 and 25 and the resistors 26 and 27 consitute means for controlling the pass-band of each line.

The polarization means comprise a bridge of resistors 28 and 29 connected to the input of an amplifier 30 whose output is connected, on one hand to the ground through a capacitor 31, and on the other hand to the line 11 through a resistor 32 and to the line 12 through a resistor 34.

It will therefore be understood that the capacitors 20 and 21 and the resistors 32 and 34 connected as a bridge to the input terminals of the comparator 19 constitute the means for establishing the derivative of the signals circulating in the information transmitting lines 11 and 12, while the comparator 19 constitutes the means for shaping the output signals of these means before they are transmitted to the rest of the processing means of the elements. This enables the elements to operate on the edges of the signals and not between the edges of the latter, and enables the device to operate even when one of the lines 11 or 12 is disturbed.

Indeed, in the normal operating mode, i.e. when the lines 11 and 12 operate normally, the comparator 19 receives the derivatives of the signals circulating in these lines and operates normally in the differential mode. On the other hand, when one or the other of these lines is disturbed, i.e. for example connected to the ground or to the +terminal of the battery, the comparator receives the derivative of the signals circulating in the other line, which is sufficient for its operation owing to the polarization.

Thus, the transmission of items of information may occur with a normal differential mode by a transmission on two lines or in a degraded mode on a single line by determining the derivative of the signals in this line and putting the output signals of the derivative establishing means back into shape, the inputs of the comparator 19 being polarized by the amplifier 30.

With reference now to FIG. 4 in which is shown a block diagram of the information transmitting means which are part of a device according to the invention, it can be seen that the information transmitting means comprise a first current generator 36 having a terminal connected to the positive terminal of a supply and an output which is connected through two diodes 37, 38 connected in series, to the input of a second current generator 39 whose output is connected to the ground. The transmission line, for example 11, is connected to the mid-point between the two diodes 37, 38. This structure of the information transmitting means associated with a dI/dt limitation permits preventing any over-oscillation on the signals transmitted by the transmitting means.

The diodes 37 and 38 permit, in the receiving mode of the corresponding element, preventing the transistors of the current generators 36, 39 from becoming conductive when the voltages of the disturbances exceed the supply voltages of the circuit. These information transmitting means are shown in more detail in FIG. 5 in which are seen the diodes 37 and 38 and the information transmitting line 11. The data inputs at E1 are directed toward the control means 40 of known type whose outputs are connected to current generating means, for example having transistors connected as current mirrors of the type known per se.

Furthermore, the inputs E1 are also directed at E2 toward an equivalent circuit for the supply line 12 after inversion in a gate 41 so as to obtain the signal complementary to the signal circulating in the line 11, in the line 12. As these means are of a well-known type, they will not be described in more detail.

The transmitting methods (FIG. 6) employed in the devices for the differential transmission of information in which one of the elements is a master element and the other a slave element, comprise a number of steps which include the transmission from the master element 1 of a synchronization word, then an address word for activating the corresponding slave element 2, a data word for the addressed element and lastly a check word.

After a moment corresponding to the reaction time of the device, the addressed element transmits to the master element, for example, an address word, a data word and a check word by way of confirmation.

In the device according to the invention, before transmitting its response, the slave element also delivers a synchronization word permitting a good resetting of the message when it is transmitted to other elements.

It must be understood that other embodiments of the various means described may be envisaged.

What is claimed is:

1. A device for a differential transmission of items of information between at least two elements of an automobile vehicle, each of which elements comprises: information transmitting means and information receiving means and two information transmission lines interconnecting said information transmitting means and information receiving means, means for processing signals circulating on the information transmission lines, wherein the processing means comprise means for establishing a derivative of the signals travelling on the information transmission lines and means for shaping output signals of said derivative-establishing means provided in the information receiving means, wherein the receiving means comprise means for generating a bias voltage connected to the derivative-establishing means, wherein the means for shaping comprises a comparator having a small offset and a centered hysteresis relative to the output from the means for generating a bias voltage whereby the transmission of items of information may occur with a normal differential mode by a transmission on two lines or in a degraded mode on a single line by determining the derivative of the signals in this line and putting the output signals of the derivative-establishing means back into shape.

2. A device according to claim 1, wherein said derivative-establishing means comprise a capacitor, a resistor connected as a bridge to a corresponding input terminal of the shaping means.

3. A device according to claim 1, wherein the shaping means comprise a hysteresis comparator.

4. A device according to claim 1, wherein the transmitting means comprise current generators actuated by means controlling said elements.

5. A device according to claim 4, wherein the transmitting means comprise first and second current generators and two diodes connected in series and interconnecting the first and second current generators, the information transmitting liens being connected to midpoints between the diodes.

6. A method of transmitting information by means of a device for a differential transmission of items of information between at least two elements of an automobile vehicle, each of which elements comprises information transmitting means and information receiving means and two information transmission lines interconnecting said information transmitting means and information receiving means, means for processing signals circulating on the information transmission lines, wherein the processing means comprise means for establishing a derivative of the signals travelling on the information transmission lines and means for shaping output signals of said derivative-establishing means provided in the information receiving means, wherein the receiving means comprise means for generating a bias voltage connected to the derivative-establishing means, wherein the means for shaping comprises a comparator having a small offset and a centered hysteresis relative to the output from the means for generating a bias voltage whereby the transmission of items of information may occur with a normal differential mode by a transmission on two lines or in a degraded mode on a single line by determining the derivative of the signals in this line and putting the output signals of the derivative-establishing means back into shape, one of the elements being a master element and the other element being a slave element, the master element transmitting a synchronization word before each message, and the slave element transmitting a message in response, the slave element also delivering a synchronization word before transmitting the message in response.

* * * * *